United States Patent
Kataria et al.

(10) Patent No.: US 11,614,879 B2
(45) Date of Patent: Mar. 28, 2023

(54) TECHNIQUE FOR REPLICATING OPLOG INDEX AMONG NODES OF A CLUSTER

(71) Applicant: Nutanix, Inc., San Jose, CA (US)

(72) Inventors: Alok Nemchand Kataria, Maharashtra (IN); Niranjan Sanjiv Pendharkar, Maharashtra (IN); Pete Wyckoff, Durham, NC (US); Rishi Bhardwaj, San Francisco, CA (US); Rohit Jain, Cupertino, CA (US); Shubham Shukla, Bhopal (IN); Tabrez Parvez Memon, Campbell, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 17/218,465

(22) Filed: Mar. 31, 2021

(65) Prior Publication Data
US 2022/0244856 A1 Aug. 4, 2022

(30) Foreign Application Priority Data
Jan. 29, 2021 (IN) .............................. 202141004033

(51) Int. Cl.
*G06F 3/06* (2006.01)
*H04L 67/1097* (2022.01)
(52) U.S. Cl.
CPC .............. *G06F 3/065* (2013.01); *G06F 3/067* (2013.01); *G06F 3/0617* (2013.01); *G06F 3/0664* (2013.01); *H04L 67/1097* (2013.01)

(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS 8,255,649 B2 * 8/2012 Hiraiwa .............. G06F 11/2082
711/E12.103
8,549,518 B1 10/2013 Aron et al.
(Continued)

OTHER PUBLICATIONS

Poitras, Steven "The Nutanix Bible" from https://nutanixbible.com/ Sep. 17, 2019 pp. all (Year: 2019).*
(Continued)

*Primary Examiner* — Daniel C. Chappell
(74) *Attorney, Agent, or Firm* — Cesari and McKenna, LLP (57) ABSTRACT

A technique replicates an index of an operations log (oplog) from a primary node to a secondary node of a cluster in the event of failure. The oplog functions as a staging area to coalesce random write operations directed to a virtual disk (vdisk) stored on a backend storage tier. The oplog temporarily caches write data as well as metadata describing the write data. The metadata includes descriptors to the write data corresponding to offset ranges of the vdisk and are used to identify ranges of write data for the vdisk that are cached in the oplog. To facilitate fast lookup operations of whether write data is cached in the oplog, an oplog index provides a state of the latest data for offset ranges of the vdisk that enables fast failover of metadata used to construct the oplog index in memory without downtime or significant metadata replay.

29 Claims, 8 Drawing Sheets

(58) Field of Classification Search
CPC ............... G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–6298; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3293; H01L 2225/00–1094; H03M 7/00–707; H04L 9/00–38; H04L 12/00–66; H04L 41/00–5096; H04L 49/00–9094; H04L 61/00–6095; H04L 67/00–75

See application file for complete search history.

(56) References Cited

U.S. PATENT DOCUMENTS

| | | | |
|---|---|---|---|
| 8,601,473 B1 | 12/2013 | Aron et al. | |
| 8,850,130 B1 | 9/2014 | Aron et al. | |
| 8,863,124 B1 | 10/2014 | Aron et al. | |
| 8,930,312 B1* | 1/2015 | Rath | G06F 16/278 |
| | | | 707/634 |
| 9,009,106 B1 | 4/2015 | Aron et al. | |
| 9,069,708 B2 | 6/2015 | Gill et al. | |
| 9,336,132 B1 | 5/2016 | Aron et al. | |
| 9,552,242 B1* | 1/2017 | Leshinsky | G06F 11/1471 |
| 9,652,265 B1 | 5/2017 | Narayanasamy et al. | |
| 9,720,921 B1* | 8/2017 | Bhattacharyya | G06F 9/4806 |
| 9,747,287 B1 | 8/2017 | Bhardwaj et al. | |
| 9,772,866 B1* | 9/2017 | Aron | G06F 9/45558 |
| 9,940,460 B1* | 4/2018 | Derbeko | G06F 11/1458 |
| 10,404,711 B2 | 9/2019 | Le et al. | |
| 10,579,485 B2 | 3/2020 | Venkitachalam et al. | |
| 10,904,339 B2 | 1/2021 | Mu et al. | |
| 11,210,184 B1* | 12/2021 | Gupta | G06F 11/1471 |
| 11,435,921 B2* | 9/2022 | Meiri | G06F 3/0656 |
| 2007/0250672 A1* | 10/2007 | Stroberger | G06F 11/2074 |
| | | | 711/162 |
| 2013/0339390 A1* | 12/2013 | Muller | G06F 16/24 |
| | | | 707/782 |
| 2016/0350013 A1* | 12/2016 | Aron | G06F 12/0238 |
| 2017/0060702 A1* | 3/2017 | Dave | G06F 11/2094 |
| 2020/0174940 A1* | 6/2020 | Jayaraman | G06F 9/3891 |
| 2021/0149566 A1 | 5/2021 | Wittig et al. | |
| 2021/0382777 A1* | 12/2021 | Soukhman | G06F 11/0772 |
| 2022/0188042 A1 | 6/2022 | Tatiparthi et al. | |
| 2022/0217204 A1 | 7/2022 | Tatiparthi et al. | |
| 2022/0244856 A1* | 8/2022 | Kataria | G06F 3/0664 |
| 2022/0253243 A1* | 8/2022 | Kataria | G06F 3/061 |

OTHER PUBLICATIONS

Zhihua Fan, Jin Xiong and Jie Ma, "A failure recovery mechanism for distributed metadata servers in DCFS2," Proceedings. Seventh International Conference on High Performance Computing and Grid in Asia Pacific Region, 2004., 2004, pp. 2-8, doi: 10.1109/HPCASIA.2004.1324010. (Year: 2004).*

S. Zheng, J. Wang, D. Xue, J. Shu and L. Huang, "Hydra: A Decentralized File System for Persistent Memory and RDMA Networks," in IEEE Transactions on Parallel and Distributed Systems, vol. 33, No. 12, pp. 4192-4206, Dec. 1, 2022, doi: 10.1109/TPDS.2022.3180369. (Year: 2022).*

S. Pippal, S. Singh, R. K. Sachan and D. S. Kushwaha, "High availability of databases for cloud," 2015 2nd International Conference on Computing for Sustainable Global Development (INDIACom), 2015, pp. 1716-1722. (Year: 2015).*

C.-T. Yang, W.-L. Chou, C.-H. Hsu and A. Cuzzocrea, "On Improvement of Cloud Virtual Machine Availability with Virtualization Fault Tolerance Mechanism," 2011 IEEE Third International Conference on Cloud Computing Technology and Science, 2011, pp. 122-129, doi: 10.1109/CloudCom.2011.26. (Year: 2011).*

Cano, Ignacio, "Curator: Self-Managing Storage for Enterprise Clusters" University of Washington; published Mar. 2017; pp. all.

Poitras, Steven "The Nutanix Bible" from http://stevenpoitras.com/the-nutanix-bible/ Oct. 15, 2013 (Publication date based on indicated capture date by Archive.org first publication date unknown) pp. all.

Poitras, Steven "The Nutanix Bible" from https://nutanixbible.com/ Sep. 17, 2019 pp. all.

Citrix XenDesktop 7.1 on Microsoft Hyper-V Server 2012 R2 on Nutanix Virtual Computing Platform Solution Design Citrix Validated Solutions, Jun. 25, 2014, 95 pages.

* cited by examiner

TECHNIQUE FOR REPLICATING OPLOG INDEX AMONG NODES OF A CLUSTER

CROSS-REFERENCE TO RELATED APPLICATIONS

The present application claims the benefit of India Provisional Patent Application Serial No. 202141004033, which was filed on Jan. 29, 2021, by Alok Nemchand Kataria, et al. for TECHNIQUE FOR REPLICATING OPLOG INDEX AMONG NODES OF A CLUSTER, which is hereby incorporated by reference.

BACKGROUND

Technical Field

The present disclosure relates to replication of information among nodes of a cluster and, more specifically, to replication of metadata describing data stored on a virtual disk among the nodes of clusters.

Background Information

A plurality of nodes interconnected as a cluster may be configured to provide compute and storage services for information, i.e., data and metadata, stored as storage objects, such as files or virtual disks, on storage devices organized as one or more storage tiers of the cluster. A user running client software (e.g., an application) may access the information stored on a virtual disk using input/output (I/O) accesses in accordance with filesystem protocols. Typically, these protocols specify that a storage service node should not send a reply, e.g., an acknowledgement, to the application issuing an I/O access (e.g., a write operation) to the virtual disk until the data is persistently stored as provided by a backend storage tier of the cluster. However, persistently storing the data on the backend storage tier may incur latencies.

Various means to reduce the acknowledgement latency when persistently storing data on a backend storage tier may include use of a log that allows acknowledgement of the write operations (writes) as soon as the data are recorded in the log, thereby deferring processing of the writes to the backend tier. A log index associating regions of a virtual disk to the logged data may also be used to improve access to data stored on the log. However, upon a failure/crash of the node, the log index typically has to be rebuilt (recovered) in order to allow access to the virtual disk for data not yet stored on the backend storage tier (i.e., data only recorded in the log), which recovery may be time-consuming. This results in generally restricted log sizes to avoid excessive recovery times and limits the amount of data that can be recorded in the log.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments described herein are directed to a technique configured to replicate an index of a log from a primary node to a secondary node of a cluster in the event of a failure of the primary node. The log is illustratively embodied as an operations log (oplog) that functions as a staging area to coalesce input/output (I/O) accesses, such as random write operations, directed to a virtual disk (vdisk) hosted by the primary node and stored on a backend storage tier organized as an extent store of a distributed storage fabric (DSF). The oplog temporarily stores (caches) data associated with the random write operations (i.e., write data) as well as metadata describing the write data. The metadata includes descriptors (e.g., pointers) to the write data corresponding to virtual address regions, i.e., offset ranges, of the vdisk and, thus, are used to identify the offset ranges of write data for the vdisk that are cached (captured) in the oplog. To facilitate fast lookup operations of the offset ranges when determining whether write data is captured in the oplog, a data structure, e.g., binary search tree, is embodied as an oplog is index configured to provide a state of the latest data at offset ranges of the vdisk. The technique enables fast failover of metadata used to construct the oplog index in memory of a node, such as the secondary node, without downtime (i.e., I/O interruption) or significant metadata replay.

In an embodiment, the oplog resides on a frontend storage tier of the DSF and is configured to coalesce the write operations (writes) into a batch for periodic forwarding (draining) in a single operation to the extent store. The captured metadata of the oplog is batched (collected) into one or more groups of predetermined size and recorded as one or more incremental images (episodes) of metadata records in an oplog metafile on the frontend storage tier. Each episode of the oplog metafile is marked with a timestamp identifier (ID) and durably stored on a distributed metadata store. The episodes of the oplog metafile are replicated across one or more nodes of the cluster according to a replication factor (RF) algorithm used for vdisk replication to ensure global redundancy protection and availability of data in the cluster. Notably, the oplog index provides an in memory (in-core) representation of the oplog metafile that may be examined (i.e., searched) to quickly determine the offset ranges corresponding to the latest data written to the vdisk.

As the random writes of the episodes are periodically drained to the extent store, the oplog metafile associated with the drained writes is deleted from the frontend storage tier. A data I/O manager of the DSF may send the appropriate episodes to the secondary node in accordance with a replication procedure. Alternatively, the data I/O manager may send the IDs of the episodes to the secondary node, which may then use the IDs to enable retrieval of the metadata records from the extent store. In either case, a representation of the in-core oplog index is conveyed (i.e., the episode metadata records of the oplog metafile) between the nodes, such that the secondary node is constantly receiving the metadata needed to build (update) the in-core oplog index at the secondary node.

In one or more embodiments, the technique includes enhancements for performing replication, including recovery and synchronization, of the oplog index in a is batch format using the episodes of the oplog metafile as time-stamped consistency points of the oplog. To that end, the secondary node runs a continuous update and/or recovery (failover) procedure that replays the latest episodes of the oplog metafile on its replicated in-core oplog index to effectively copy-by-reconstruction the in-core oplog index of the primary node to the secondary node. In effect, the secondary node performs a non-stop (re)construction and synchronization of the in-core oplog index of the primary node as if failover had occurred. Because the replay is continuous on the secondary node, only a subset of episodes may be replayed at any time, so that a consistent copy of the primary node's in-core oplog index is quickly updated on the secondary node. As such, synchronization and update from the primary node can occur to the secondary node with near full I/O latency performance (i.e., little to no latency increase is incurred from replaying a latest episode at the secondary node during failover).

In one or more embodiments, recovery and synchronization of the in-core oplog index in the event of a primary or secondary node failure may involve multiple failover scenarios that endeavor to avoid I/O interruption (though some reduced throughput and higher I/O latency may be acceptable). For example, a first scenario involves failover of the primary node to the secondary node wherein the secondary node rapidly reconstructs the in-core index data structure to resume full I/O performance. In addition, a new in-core oplog index replica is allocated to a remote node (e.g., selected according to the RF data protection algorithm), which fully constructs the replica from the episodes of the oplog metafile. A second scenario involves a failover of the secondary node to a remote node, whereas a third scenario involves partial loss of index replication among the nodes. Illustratively, the second and third scenarios achieve total or partial reconstruction of the in-core oplog index by synchronizing and replaying all or some of the missing episodes of the oplog metafile, where in-progress oplog index replica reconstruction is marked as "in-sync" until fully synchronized.

A fourth scenario involves primary node failover to a secondary node not previously hosting either the vdisk or oplog/oplog index. Here, oplog index synchronization from the primary node to the secondary node is in progress and/or not is yet complete when the primary node fails. In-progress synchronization at the secondary node continues from a remote node selected to host replicas of the vdisk and oplog (according to the RF data protection), which prevents the ability of the secondary node to accommodate new I/O (random write) accesses to the vdisk as the oplog index is still being replayed. Thus, the new I/O accesses are redirected to the remote node during the re-synchronization of the oplog index on the secondary node. After the oplog index of the secondary node is synchronized using, e.g., the redirected oplog entries from the remote node, the secondary node can terminate oplog redirection and perform failover oplog operations similar to the first scenario mentioned above. A fifth failover scenario is similar to the fourth scenario, but with all oplog metadata entries being entirely reconstructed with suspension of I/O accesses during recovery/reconstruction.

Advantageously, the technique enables efficient replication of the oplog index across nodes of one or more clusters to thereby substantially reduce or eliminate I/O interruption resulting from recovery (rebuilding) of metadata of the index used to improve (i.e., reduce latency of) I/O access to a vdisk in the event of a failure to a node hosting the vdisk. As a result, increased-sized oplogs may be deployed to permit improved I/O servicing (e.g., greater cache hits from a larger oplog) that results in higher throughput while maintaining low latency with the additional benefit of substantially reduced recovery time.

DESCRIPTION

Figure 1:
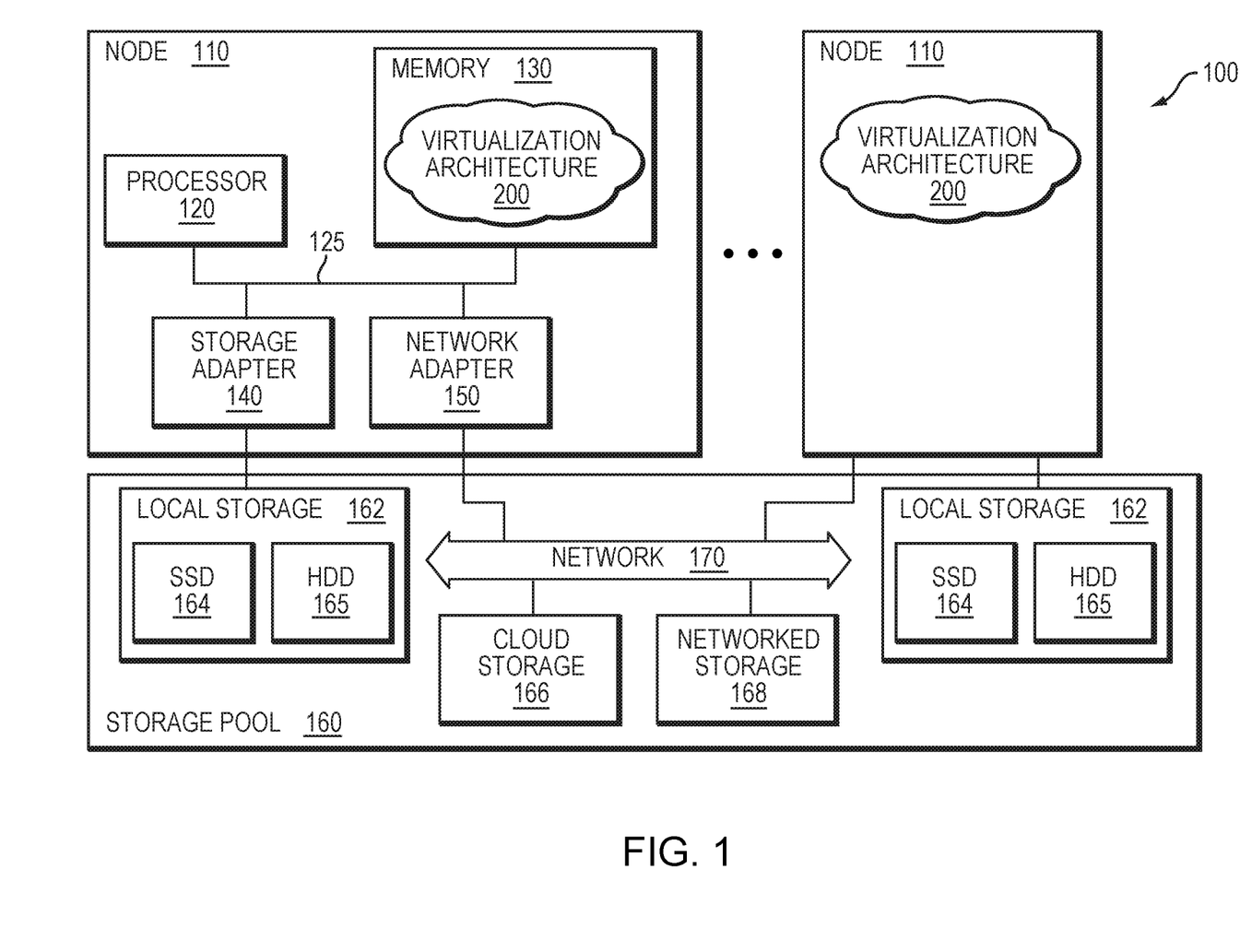
FIG. 1 is a block diagram of a plurality of nodes interconnected as a cluster in a virtualized environment.

FIG. 1 is a block diagram of a plurality of nodes 110 interconnected as a cluster 100 and configured to provide compute and storage services for information, i.e., data and metadata, stored on storage devices of a virtualization environment. Each node 110 is illustratively embodied as a physical computer having hardware resources, such as one or more processors 120, main memory 130, one or more storage adapters 140, and one or more network adapters 150 coupled by an interconnect, such as a system bus 125. The storage adapter 140 may be configured to access information stored on storage devices, such as solid state drives (SSDs) 164 and magnetic hard disk drives (HDDs) 165, which are organized as local storage 162 and virtualized within multiple tiers of storage as a unified storage pool 160, referred to as scale-out converged storage (SOCS) accessible cluster-wide. To that end, the storage adapter 140 may include input/output (I/O) interface circuitry that couples to the storage devices over an I/O interconnect arrangement, such as a conventional peripheral component interconnect (PCI) or serial ATA (SATA) topology.

The network adapter 150 connects the node 110 to other nodes 110 of the cluster 100 over a network, which is illustratively an Ethernet local area network (LAN) 170. The network adapter 150 may thus be embodied as a network interface card having the mechanical, electrical and signaling circuitry needed to connect the node 110 to the LAN. In an embodiment, one or more intermediate stations (e.g., a network switch, router, or virtual private network gateway) may interconnect the LAN with network segments organized as a wide area network (WAN) to enable communication between the cluster 100 and a remote cluster over the LAN and WAN (hereinafter "network") as described further herein. The multiple tiers of SOCS include storage that is accessible through the network, such as cloud storage 166 and/or networked storage 168, as well as the local storage 162 within or directly attached to the node 110 and managed as part of the storage pool 160 of storage objects, such as files and/or logical units (LUNs). The cloud and/or networked storage may be embodied as network attached storage (NAS) or storage area network (SAN) and include combinations of storage devices (e.g., SSDs and/or HDDs) from the storage pool 160. Communication over the network may be effected by exchanging discrete frames or packets of data according to protocols, such as the Transmission Control Protocol/Internet Protocol (TCP/IP) and the OpenID Connect (OIDC) protocol, although other protocols, such as the User Datagram Protocol (UDP) and the HyperText Transfer Protocol Secure (HTTPS) may also be advantageously employed.

Figure 2:
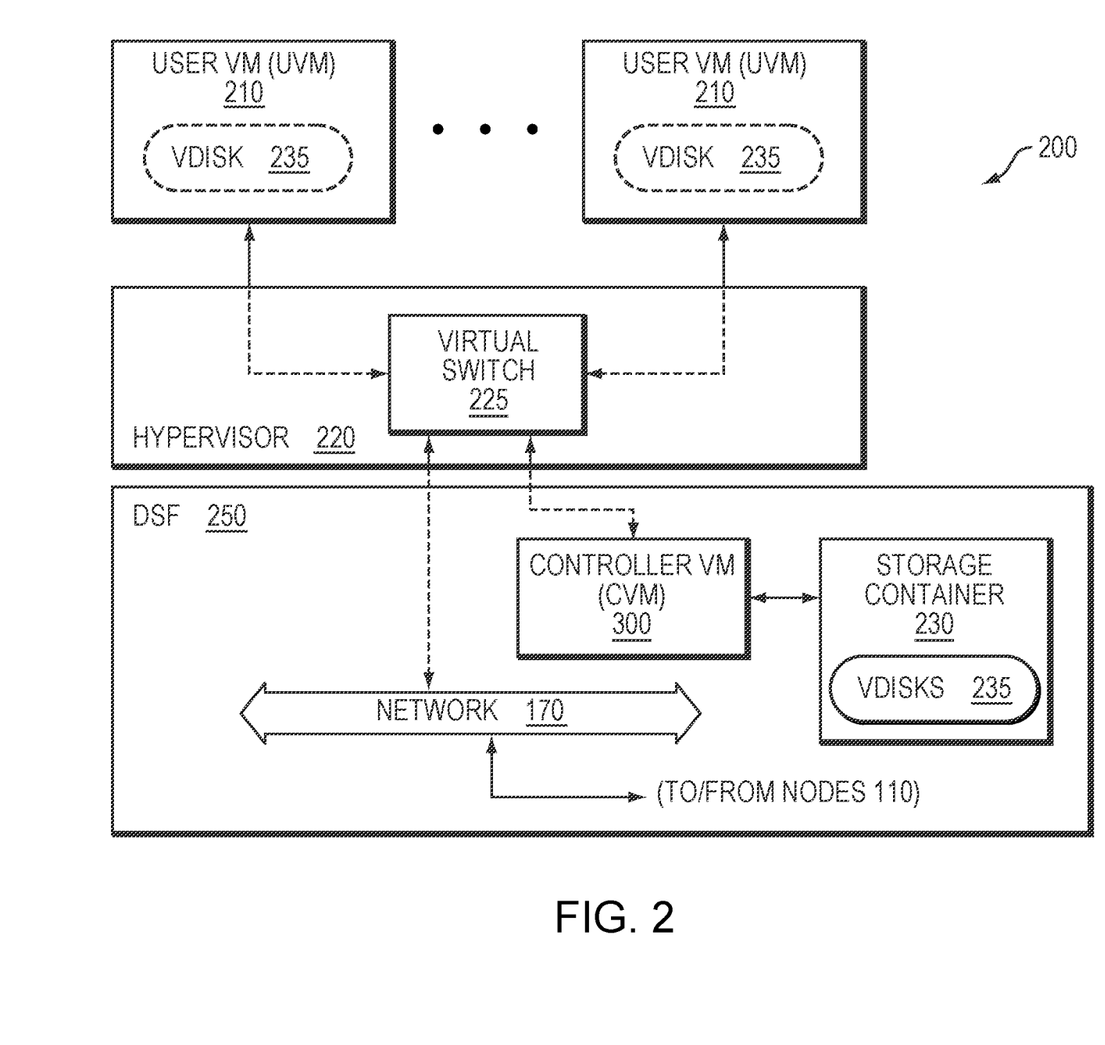
FIG. 2 is a block diagram of a virtualization architecture executing on a node to implement the virtualization environment.

The main memory 130 includes a plurality of memory locations addressable by the processor 120 and/or adapters for storing software code (e.g., processes and/or services) and data structures associated with the embodiments described herein. The processor and adapters may, in turn, include processing elements and/or circuitry configured to execute the software code, such as virtualization software of virtualization architecture 200, and manipulate the data structures. As described herein, the virtualization architecture 200 enables each node 110 to execute (run) one or more virtual machines that write data to the unified storage pool. 160 as if they were writing to a SAN. The virtualization environment provided by the virtualization architecture 200 relocates data closer to the virtual machines consuming the data, by storing the data locally on the local storage 162 of the cluster 100 (if desired), resulting in higher performance at a lower cost. The virtualization environment can horizontally scale from a few nodes 110 to a large number of nodes, enabling organizations to scale their infrastructure as their needs grow.

It will be apparent to those skilled in the art that other types of processing elements and memory, including various computer-readable media, may be used to store and execute program instructions pertaining to the embodiments described herein. Also, while the embodiments herein are described in terms of software code, processes, and computer (e.g., application) programs stored in memory, alternative embodiments also include the code, processes and programs being embodied as logic, components, and/or modules consisting of hardware, software, firmware, or combinations thereof.

FIG. 2 is a block diagram of a virtualization architecture 200 executing on a node to implement the virtualization environment. Each node 110 of the cluster 100 includes software components that interact and cooperate with the hardware resources to implement virtualization. The software components include a hypervisor 220, which is a virtualization platform configured to mask low-level hardware operations from one or more guest operating systems executing in one or more user virtual machines (UVMs) 210 that run client software. The hypervisor 220 allocates the hardware resources dynamically and transparently to manage interactions between the underlying hardware and the UVMs 210. In an embodiment, the hypervisor 220 is illustratively the Nutanix Acropolis Hypervisor (AHV), although other types of hypervisors, such as the Xen hypervisor, Microsoft's Hyper-V, RedHat's KVM, and/or VMware's ESXi, may be used in accordance with the embodiments described herein.

Another software component running on each node 110 is a special virtual machine, called a controller virtual machine (CVM) 300, which functions as a virtual controller for SOCS. The CVMs 300 on the nodes 110 of the cluster 100 interact and cooperate to form a distributed system that manages all storage resources in the cluster. Illustratively, the CVMs and storage resources that they manage provide an abstraction of a distributed storage fabric (DSF) 250 that scales with the number of nodes 110 in the cluster 100 to provide cluster-wide distributed storage of data and access to the storage resources with data redundancy across the cluster. That is, unlike traditional NAS/SAN solutions that are limited to a small number of fixed controllers, the virtualization architecture 200 continues to scale as more nodes are added with data distributed across the storage resources of the cluster. As such, the cluster operates as a hyper-convergence architecture wherein the nodes provide both storage and computational resources available cluster wide.

The client software (e.g., applications) running in the UVMs 210 may access the DSF 250 using filesystem protocols, such as the network file system (NFS) protocol, the common internet file system (CIFS) protocol and the internet small computer system interface (iSCSI) protocol. Operations on these filesystem protocols are interposed at the hypervisor 220 and redirected (via virtual switch 225) to the CVM 300, which exports one or more iSCSI, CIFS, or NFS targets organized from the storage objects in the storage pool 160 of DSF 250 to appear as disks to the UVMs 210. These targets are virtualized, e.g., by software running on the CVMs, and exported as virtual disks (vdisks) 235 to the UVMs 210. In some embodiments, the vdisk is exposed via iSCSI, CIFS or NFS and is mounted as a virtual disk on the UVM 210. User data (including the guest operating systems) in the UVMs 210 reside on the vdisks 235 and operations on the vdisks are mapped to physical storage devices (SSDs and/or HDDs) located in DSP 250 of the cluster 100.

In an embodiment, the virtual switch 225 may be employed to enable I/O accesses from a UVM 210 to a storage device via a CVM 300 on the same or different node 110. The UVM 210 may issue the I/O accesses as a SCSI protocol request to the storage device. Illustratively, the hypervisor 220 intercepts the SCSI request and converts it to an iSCSI, CIFS, or NFS request as part of its hardware emulation layer. As previously noted, a virtual SCSI disk attached to the UVM 210 may be embodied as either an iSCSI LUN or a file served by an NFS or CIFS server. An iSCSI initiator, SMB/CIFS or NFS client software may be employed to convert the SCSI-formatted UVM request into an appropriate iSCSI, CIFS or NFS formatted request that can be processed by the CVM 300. As used herein, the terms iSCSI, CIFS and NFS may be interchangeably used to refer to an IP-based storage protocol used to communicate between the hypervisor 220 and the CVM 300. This approach obviates the need to individually reconfigure the software executing in the UVMs to directly operate with the IP-based storage protocol as the IP-based storage is transparently provided to the UVM.

For example, the IP-based storage protocol request may designate an IP address of a CVM 300 from which the UVM 210 desires I/O services. The IP-based storage protocol request may be sent from the UVM 210 to the virtual switch 225 within the hypervisor 220 configured to forward the request to a destination for servicing the request. If the request is intended to be processed by the CVM 300 within the same node as the UVM 210, then the IP-based storage protocol request is internally forwarded within the node to the CVM. The CVM 300 is configured and structured to properly interpret and process that request. Notably the IP-based storage protocol request packets may remain in the node 110 when the communication the request and the response begins and ends within the hypervisor 220. In other embodiments, the IP-based storage protocol request may be routed by the virtual switch 225 to a CVM 300 on another node of the same or different cluster for processing. Specifically, the IP-based storage protocol request may be forwarded by the virtual switch 225 to an intermediate station (not shown) for transmission over the network (e.g., WAN) to the other node. The virtual switch 225 within the hypervisor 220 on the other node then forwards the request to the CVM 300 on that node for further processing.

Figure 3:
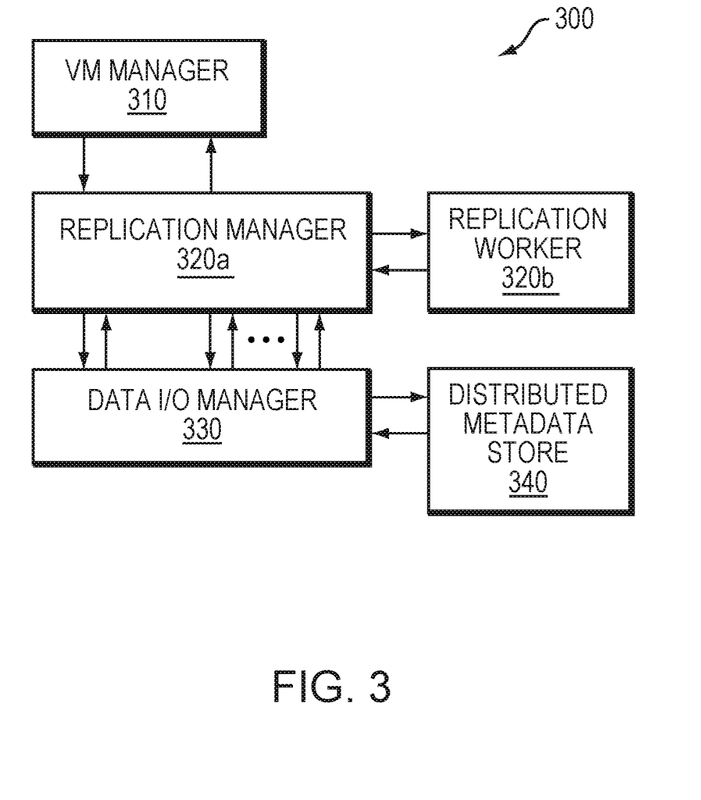
FIG. 3 is a block diagram of a controller virtual machine of the virtualization architecture.

FIG. 3 is a block diagram of the controller virtual machine (CVM) 300 of the virtualization architecture 200. In one or more embodiments, the CVM 300 runs an operating system (e.g., the Acropolis operating system) that is a variant of the Linux® operating system, although other operating systems may also be used in accordance with the embodiments described herein. The CVM 300 functions as a distributed storage controller to manage storage and I/O activities within DSF 250 of the cluster 100. Illustratively, the CVM 300 runs as a virtual machine above the hypervisor 220 on each node and cooperates with other CVMs in the cluster to form the distributed system that manages the storage resources of the cluster, including the local storage 162, the networked storage 168, and the cloud storage 166. Since the CVMs run as virtual machines above the hypervisors and, thus, can be used in conjunction with any hypervisor from any virtualization vendor, the virtualization architecture 200 can be used and implemented within any virtual machine architecture, allowing the CVM to be hypervisor agnostic. The CVM 300 may therefore be used in variety of different operating environments due to the broad interoperability of the industry standard IP-based storage protocols (e.g., iSCSI, CIFS, and NFS) supported by the CVM.

Illustratively, the CVM 300 includes a plurality of processes embodied as a storage stack that may be decomposed into a plurality of threads running in a user space of the operating system of the CVM to provide storage and I/O management services within DSF 250. In an embodiment, the user mode processes include a virtual machine (VM) manager 310 configured to manage creation, deletion, addition and removal of virtual machines (such as UVMs 210) on a node 110 of the cluster 100. For example, if a UVM fails or crashes, the VM manager 310 may spawn another UVM 210 on the node. A replication manager 320a is configured to provide replication and disaster recovery capabilities of DST 250. Such capabilities include migration/failover of virtual machines and containers, as well as scheduling of snapshots. In an embodiment, the replication manager 320a may interact with one or more replication workers 320b. A data I/O manager 330 is responsible for all data management and I/O operations in DSF 250 and provides a main interface to/from the hypervisor 220, e.g., via the IP-based storage protocols. Illustratively, the data I/O manager 330 presents a vdisk 235 to the UVM 210 in order to service I/O access requests by the UVM to the DFS. A distributed metadata store 340 stores and manages all metadata in the node/cluster, including metadata structures that store metadata used to locate (map) the actual content of vdisks on the storage devices of the cluster.

Figure 4:
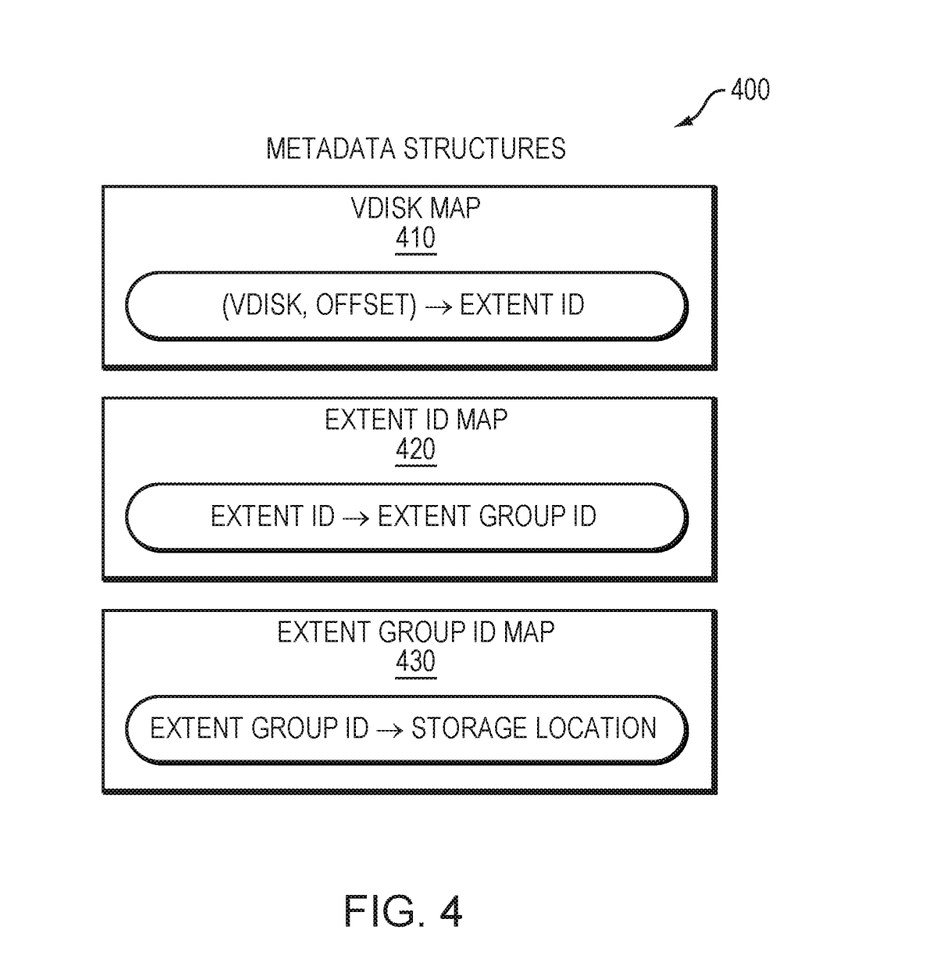
FIG. 4 is a block diagram of metadata structures used to map virtual disks (vdisks) of the virtualization architecture.

FIG. 4 is block diagram of metadata structures 400 used to map virtual disks of the virtualization architecture. Each vdisk 235 corresponds to a virtual address space for storage exposed as a disk to the UVMs 210. Illustratively, the address space is divided into equal sized units called virtual blocks (vblocks). A vblock is a chunk of pre-determined storage, 1 MB, corresponding to a virtual address space of the vdisk that is used as the basis of metadata block map structures (maps) described herein. The data in each vblock is physically stored on a storage device in units called extents. Extents may be written/read/modified on a sub-extent basis (called a slice) for granularity and efficiency. A plurality of extents may be grouped together in a unit called an extent group. Each extent and extent group may be assigned a unique identifier (ID), referred to as an extent ID and extent group ID, respectively. An extent group is a unit of physical allocation that is stored as a file on the storage devices, which may be further organized as an extent store.

Illustratively, a first metadata structure embodied as a vdisk map 410 is used to logically map the vdisk address space for stored extents. Given a specified vdisk and offset, the logical vdisk map 410 may be used to identify a corresponding extent (represented by extent ID). A second metadata structure embodied as an extent ID map 420 is used to logically map an extent to an extent group. Given a specified extent ID, the logical extent ID map 420 may be used to identify a corresponding extent group containing the extent. A third metadata structure embodied as an extent group ID map 430 is used to map a specific physical storage location for the extent group. Given a specified extent group ID, the physical extent group ID map 430 may be used to identify information corresponding to the physical location of the extent group on the storage devices such as, for example, (1) an identifier of a storage device that stores the extent group, (2) a list of extent IDs corresponding to extents in that extent group, and (3) information about the extents such as reference counts checksums, and offset locations.

Figure 5:
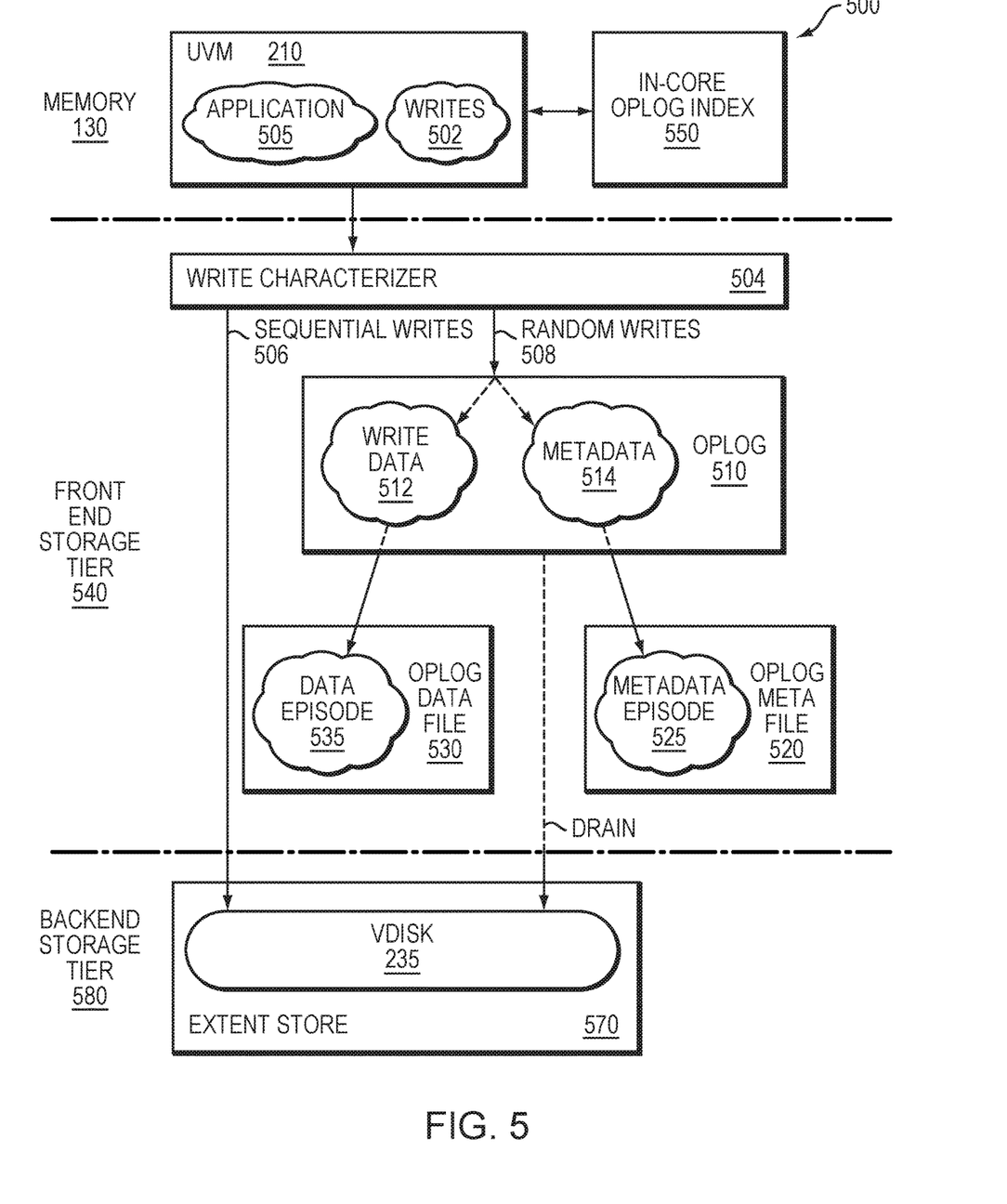
FIG. 5 is a diagram illustrating an exemplary input/output (I/O) path of the virtualization architecture.

FIG. 5 is a diagram illustrating an exemplary input/output (I/O) path 500 of the virtualization architecture. An application 505 running in UVM 210 issues I/O accesses, such as write operations (writes) 502, to vdisk 235 exported from a backend storage tier 580 organized as an extent store 570 of DSF 250. The writes 502 are received at a write characterizer 504, e.g., of data I/O manager 330. Illustratively, writes 502 are characterized based on write pattern and either (1) forwarded by the write characterizer 504 directly to the vdisk 235 as sequential writes 506 on the extent store 570 (e.g., larger block sequential writes resulting in pending queue sizes above a threshold); or (2) temporarily stored (cached) as random writes 508 (and smaller block sequential writes resulting in pending queue sizes below the threshold) at a log illustratively embodied as an operations log (oplog) 510, coalesced and sequentially drained to the extent store 570 (e.g., large block random writes). Note that the pending queue size threshold used to characterize the writes may be adjusted (e.g., lowered) as data stored in the oplog reaches capacity so that more writes 502 are forwarded directly to the extent store bypassing storage in the oplog. The oplog 510 functions as a staging area to coalesce the random writes 508 as a batch for periodic forwarding (draining) in a single operation to the extent store 570. In an embodiment, there is one oplog 510 associated with each vdisk 235, wherein the oplog 510 is persistently stored by the storage stack of the CVM 300 within a fast frontend storage tier 540 of DSF 250, e.g., on non-volatile memory express (NVMe) storage devices. Persistent storage of the oplog 510 on the frontend tier 540 enables fast acknowledgment of the random writes 508 issued by the application 505 running in UVM 210. In essence, the write characterizer 504 cooperates with the oplog 510 to manage the latencies (e.g., acknowledgement latency and backend storage latency) associated with the random writes 508.

Illustratively, the oplog 510 caches (captures) the data associated with the random writes (i.e., write data 512) and the metadata 514 describing the write data. The metadata 514 includes descriptors (e.g., pointers) to the write data 512 corresponding to virtual address regions, i.e., offset ranges, of the vdisk 235 and, thus, are used to identify the offset ranges of write data 512 for the vdisk 235 that are captured in the oplog 510. The captured metadata 514 of the oplog 510 is batched (collected) into one or more groups of predetermined size or number of entries, e.g., 250 KiB or 5000 entries, and recorded as one or more incremental images (metadata episodes 525) of metadata records in an oplog metafile 520 on the frontend storage tier 540. Similarly, the captured write data 512 may be grouped to a predetermined size, e.g., 500 MB, and recorded as one or more data episodes 535 of data in an oplog data file 530 on the frontend storage tier 540. Each episode of the oplog data and metafiles is marked with a timestamp identifier (ID) (i.e., a timestamp used as an identifier).

In an embodiment, the episodes of the oplog data file 530 and oplog metafile 520 are replicated across one or more nodes 110 (e.g., a primary node and a secondary node) of the cluster 100 according to a replication factor (RF) algorithm used for vdisk replication to ensure global redundancy protection and availability of data in the cluster. Illustratively, the data I/O manager 330 is a data plane process configured to perform a data and metadata replication procedure between the primary node and a data I/O manager "peer" on the secondary node, as described further herein. To that end, the data I/O manager 330 may employ remote direct memory access (RDMA) capabilities integrated in its code path used for vdisk replication in accordance with RF data protection to replicate the oplog data and metadata episodes across the nodes. Note that additional information may be stored on the distributed metadata store, such as (i) the node locations of the oplog metafiles (including RF replicas) for the replicated vdisk as well as (ii) IDs denoting beginning and ending (e.g., lowest and highest timestamps) of valid records in the episodes of those files. Durable storage of such information facilitates replication of the metadata episodes 525 from the primary node to the secondary node as described herein.

To facilitate fast lookup operations of the offset ranges when determining whether write data 512 is captured in the oplog 510, a data structure, e.g., binary search tree such as a B (B+) tree, is embodied as an oplog index 550 configured to provide a state of the latest data at offset ranges of the vdisk 235. Notably, the oplog index 550 is stored in memory 130, i.e., dynamic random access memory (DRAM), of node 110 to provide an in-core representation of the oplog metafile 520 that may be examined to quickly determine the offset ranges for the latest data written to the vdisk 235. Instead of performing a sequential read through the oplog metafile 520 to determine offset ranges for random writes 508 captured in the oplog 510, the in-core oplog index 550 may be examined (i.e., searched) to quickly determine the offset ranges corresponding to the latest data written to the vdisk 235.

As the random writes 508 of the metadata episodes 525 are periodically drained to is the extent store 570, e.g., by a background process, the oplog metafile 520 associated with the drained writes is deleted (garbage collected) from the frontend storage tier 540. The data I/O manager 330 may send the appropriate metadata episodes 525, e.g., via a remote procedure call, to the secondary node in accordance with the replication procedure. Alternatively, the data I/O manager 330 may send the IDs of the metadata episodes 525 to the secondary node, which may then fetch appropriate node location information of the metadata records of the metadata episodes 525 from the distributed metadata store 340 to enable retrieval of the metadata records from the extent store 570. In either case, a representation of the in-core oplog index 550 is conveyed (i.e., the episode metadata records of the oplog metafile) between the nodes, such that the secondary node is constantly receiving the metadata needed to build (or update) the in-core oplog index 550 at the secondary node. Once the metadata episodes 525 are applied to the in-core oplog index 550, the information relating to the episodes may be deleted from the distributed metadata store 340.

In the event of a primary node failure/crash, the in-core oplog index 550 may be recovered (rebuilt) on the secondary node using either a copy (replica) of the oplog metafile 520 that was replicated on the secondary node in accordance with the RF data protection algorithm or the metadata episodes 525 stored on the extent store 570. Recovery may be implemented by replaying metadata records of the episodes 525 not yet applied to an existing oplog index starting from the beginning of the file and proceeding forwards to construct an up-to-date (i.e., at a time of the failover) copy of the oplog index data structure in memory of the secondary node. However, when recovering from scratch (i.e., not reconstructing from an existing oplog index), metadata records of the episodes 525 are applied from the end of the file and proceeding backwards to construct an up-to-date (i.e., at a time of the failover) copy of the oplog index. During recovery, I/O accesses, such as reads and writes, to the vdisk 235 may be suspended because of the inability to determine whether offset ranges of the I/O accesses overlap with random writes 508 captured in the oplog 510 while the oplog index is being constructed at the is secondary node. Yet, suspension of I/O accesses may impact compute and storage service performance of the cluster 100.

Figure 6:
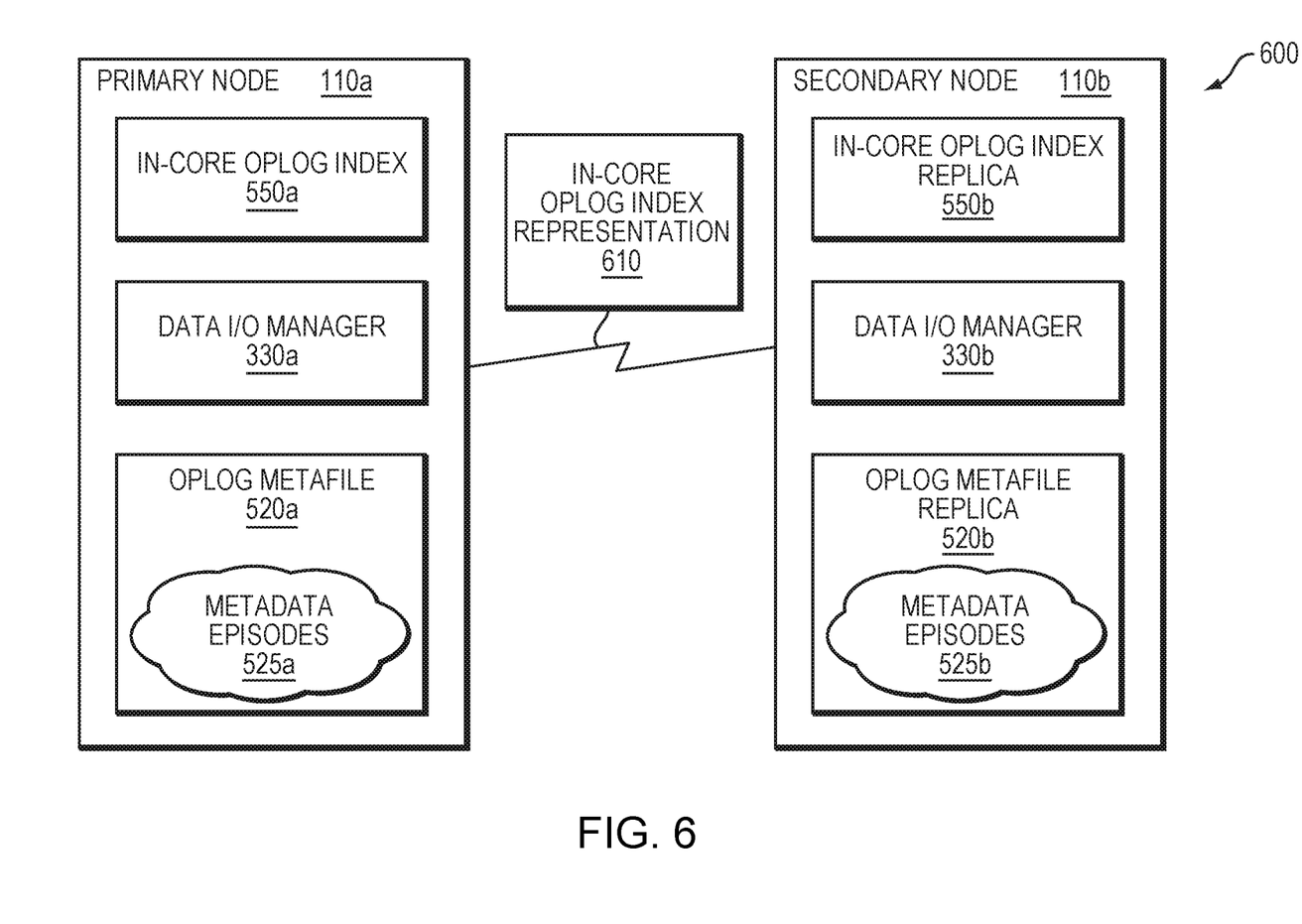
FIG. 6 is diagram illustrating a technique for replicating an operations log (oplog) index among one or more nodes of the cluster.

The embodiments described herein are directed to a technique configured to replicate an in-core oplog index from a primary node to a secondary node of a cluster in the event of a failure of the primary node. The technique enables fast failover of metadata used to construct the oplog index in memory (in-core) of the secondary node (such as a node associated with RF data protection) without downtime (I/O interruption) or significant metadata replay. The technique further includes enhancements for performing replication, including recovery and synchronization, of the oplog index in a batch format using the episodes of the oplog metafile as timestamped consistency points of the oplog. FIG. 6 is a diagram illustrating the technique 600 for replicating the oplog index among one or more nodes, such as a primary node 110a and a secondary node 110b, of the cluster 100. As noted, the data I/O manager 330a of primary node 110a sends a representation 610 of the in-core oplog index 550a (i.e., metadata records of metadata episodes 525a of the oplog metafile 520a) to the secondary node 110b such that the secondary node is constantly receiving the metadata records needed to continuously build (or update) a replica of the in-core oplog index 550b at the secondary node 110b.

Illustratively, the secondary node 110b runs a continuous update and/or recovery (failover) procedure that replays the latest episodes 525b of the oplog metafile replica 520b on its in-core oplog index replica 550b to effectively copy-by-reconstruction the in-core oplog index 550a of the primary node 110a at the secondary node 110b. In effect, the secondary node 110b performs a non-stop (i.e., continuous) (re)construction and synchronization of the in-core oplog index 550a of the primary node as if failover had occurred. Because the replay is continuous on the secondary node, only a subset of metadata episodes 525b may be replayed at any time, so that a consistent copy of the primary node's in-core oplog index 550a is quickly updated on the secondary node (i.e., in milliseconds). As such, synchronization and update from the primary node 110a can occur to the secondary node 110b with near full I/O latency performance (i.e., little to no latency increase is incurred from replaying a latest episode at the secondary node during failover).

For example, assume that new offset ranges from random writes 508 are issued serially by application 505 running on the UVM 210 to vdisk 235, hosted on the primary node 110a, which results in a series of new entries added to the in-core oplog index 550a on the primary node. Illustratively, in response to each random write, the oplog metafile 520a (and associated oplog data file) on the primary node 110a, as well as the oplog metafile replica 520b (and associated oplog data file replica) on the secondary node 110b, are updated. Each in-core oplog index 550a,b is also updated to indicate that the offset range is within the oplog 510. At this time, the completion of the random write 508 may be acknowledged to the application 505. Thereafter, a commit record is (asynchronously) written on the oplog metafile 520 for a current batch of random write updates that has been durably replicated and drained, indicating that no rollover to a subsequent batch update is required (i.e., the random writes of the current batch are considered purged from the oplog).

Notably, replication of each new occurrence of an oplog index entry on the secondary node (i.e., in-line replication) may increase the latency for every random write 508 issued by the application 505 to the vdisk 235. Thus, instead of employing such in-line replication, in an embodiment, the metadata episodes 525a of the oplog metafile 520a may be leveraged to perform batch replication such that, upon the close of an episode 525a (i.e., after writing 500 MB of the data to the oplog 510), the metadata records of the associated oplog metafile 520a may be replicated to the secondary node 110b. According to the technique, creation of a metadata episode 525 establishes a consistency point of the oplog metafile 520 that may be used as a trigger for in-core oplog index replication and synchronization. For example, the latest episode ID created on the primary node 110a is durably stored (and maintained) on the distributed metadata store 340 and may be compared with the last episode ID replicated on the secondary node 110b. If necessary, the latest episode (and intervening episodes) of the oplog metafile 520 may be retrieved from the extent store 570 and replayed to update the in-core oplog is index replica 550b of the secondary node 110b.

As noted, the data I/O manager 330 is configured to perform a data and metadata replication procedure between the primary node and a data I/O manager "peer" on the secondary node using RDMA capabilities integrated in its code path to, e.g., improve performance using passthrough of the hypervisor 220 for the network adapter 150. Once an episode 525a is closed, the data I/O manager 330a of the primary node 110a informs the data I/O manager 330b on the secondary node 110b of the closure via a message exchange between the nodes that includes the closed episode ID. In response, the data I/O manager 330b of the secondary node 110b fetches the appropriate metadata episodes of the oplog metafile 520 from the extent store 570 and replays the appropriate metadata records of the closed episode to update the in-core oplog index replica 550b of the secondary node 110b. Alternatively, the data I/O manager 330a of the primary node 110a may send the metadata records of the closed episode 525 directly to the data I/O manager 330b of the secondary node 110b for updating the in-core oplog index replica.

In either case, during update/recovery, the oplog index replica is updated with any uncommitted (rolled over) batches of random write updates, as well as metadata records in any open metadata episodes. The data I/O managers then update appropriate information in the distributed metadata store 340 indicating the latest updated episode in their in-core oplog indexes. Notably, an in-core oplog index representation 610 is conveyed (i.e., the episode metadata records of the oplog metafile 520) between the nodes, such that the secondary node 110b is constantly receiving the metadata (e.g., the primary node replicates the metadata to the secondary node) needed to build the in-core oplog index replica 550b.

Figure 7:
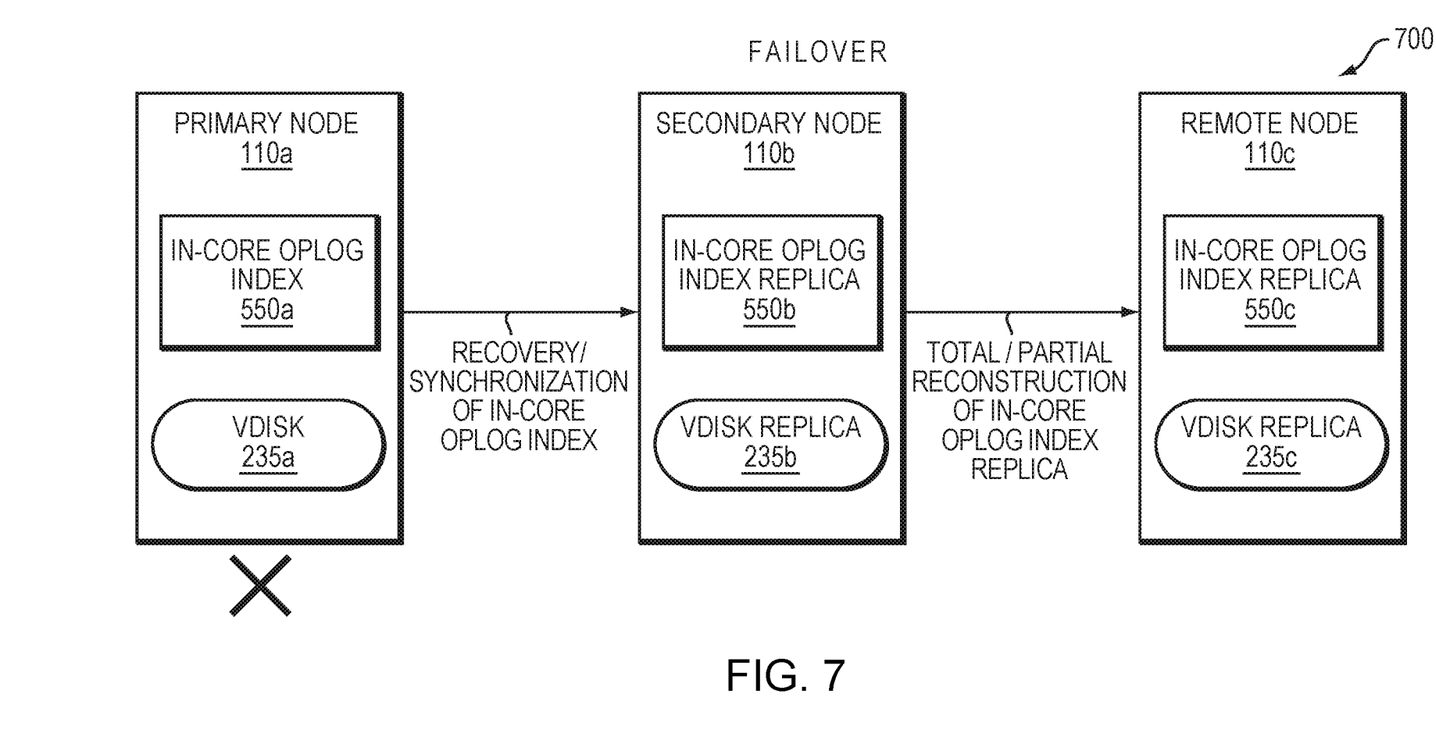
FIG. 7 is a diagram illustrating an exemplary failover of one or more nodes of the cluster.

In one or more embodiments, recovery and synchronization of the in-core oplog index 550 in the event of a primary or secondary node failure may involve multiple failover scenarios that endeavor to avoid I/O interruption (though some reduced throughput and higher I/O latency may be acceptable). FIG. 7 is a diagram illustrating an exemplary failover of one or more nodes of the cluster. For example, a first scenario involves failover 700 of the primary node 110a to the secondary node 110b wherein the primary node fails (as denoted by "X"), and recovery/synchronization of the in-core oplog index data structure proceeds in accordance with the failover procedure described above with the secondary node rapidly reconstructing the in-core oplog index replica 550b to resume full I/O performance. Note that a vdisk replica 235b of the vdisk 235a (hosted on primary node 110a) may be re-hosted on the secondary node 110b (as well as replicas of the oplog data/metafiles) due to RF data protection in response to an inadequate number of replicas in the cluster. As such, a new in-core oplog index replica 550c (and vdisk replica 235c) may be allocated to a remote node 110c (e.g., selected according to the RF data protection algorithm), which constructs (synchronizes) the replica 550c from the existing oplog index replica 550b (e.g., metadata episodes 525 of the oplog metafile 520) of the secondary node 110b. Illustratively, during synchronization, the oplog index replica 550c is marked as being in an "in-sync" state until fully synchronized. Thereafter, the state of the in-core oplog index replica 550c is changed to "active."

In an embodiment, synchronization of an allocated "in-sync" oplog index replica from an existing "active" oplog index replica involves the following synchronization procedure for the entire oplog index associated with the vdisk. For example, offset ranges present in the "active" oplog index replica 550b of the secondary node 110b are read starting from offset 0 to the length of the vdisk, and then replicated (copied) in batches to the remote node 110c having the "in-sync" oplog index replica 550c. Once a batch is copied, non-overlapping (i.e., disjoint) portions of offset ranges present in the batch are applied to the "in-sync" oplog index replica 550c. That is, portions of offset ranges not already present in the oplog index replica 550c are applied. Note, however, that batches may be applied by "walking backwards" from newer to older so that overlapping portions of ranges already present in the oplog index replica correspond to newer writes that should not be overwritten during the synchronization procedure. Once all of the non-overlapping offset ranges are applied, the state of the oplog index replica 550c may be changed to "active." Note also that during the synchronization procedure, updates associated with random writes 508 issued by the application 505 may be applied to the in-core oplog index replica 550c.

A second scenario involves a failover 700 of secondary node 110b to remote node 110c, whereas a third scenario involves partial loss of oplog index replication among the nodes. Illustratively, the second and third scenarios achieve total or partial reconstruction of the in-core oplog index replica 550c by synchronizing and replaying all or some of the missing metadata episodes 525 of the oplog metafile 520. As with the scenarios described above, in-progress oplog index replica reconstruction is marked as "in-sync" until fully synchronized, at which time the in-core oplog index replica 550c is marked as "active." Note that the allocation of oplog index replicas, as well as the states/changes of the oplog index replicas (e.g., whether the replica is active, in-sync or inactive) are persistently stored and durably maintained on the distributed metadata store 340.

Figure 8:
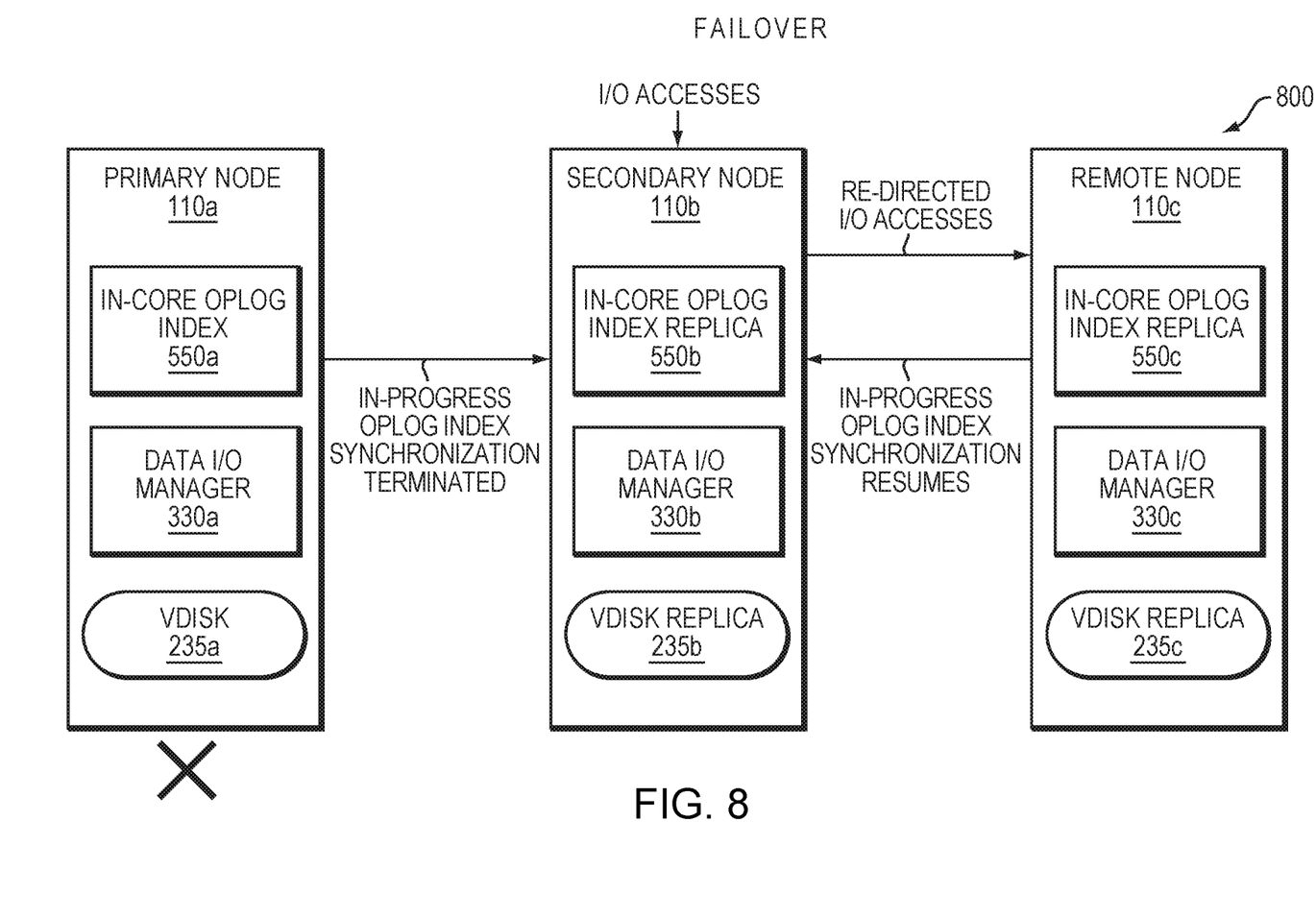
FIG. 8 is a diagram illustrating another exemplary failover of one or more nodes of the cluster.

FIG. 8 is a diagram illustrating another exemplary failover of one or more nodes of the cluster. For example, a fourth scenario involves failover 800 of a primary node 110a to a secondary node 110b that does not host (i.e., not previously hosting) either the vdisk or oplog/oplog index. Here, oplog index synchronization from the primary node 110a to the secondary node 110b is in progress (and/or not yet complete) when the primary node fails (as denoted by "X"), thereby terminating such synchronization. In-progress synchronization at the secondary node 110b continues (resumes) from a remote node 110c selected to host replicas of the vdisk 235c and in-core oplog index 550c, which obviates (prevents) the ability of the secondary node 110b to accommodate new I/O (e.g., random write) accesses to the vdisk 235. Thus, the new I/O accesses are redirected to the remote node 110c during the re-synchronization of the oplog index replica 550b on the secondary node 110b. However, recovery and synchronization, as well as I/O performance, may be impacted due to network latencies incurred as a result of vdisk service redirection of the I/O access to the remote node 110c.

Notably, this fourth scenario integrates knowledge of the remote node 110c hosting the replicated vdisk 235c (e.g., per RF data protection) with logic that selects the secondary node 110b for primary node failover. The data I/O manager 330b of the secondary node 110b may send a message containing the requested I/O access over the network to the data I/O manager 330c of the remote node 110c, which checks the offset ranges of the requested I/O access and, if necessary, updates its in-core oplog index replica 550c. In parallel, an aggressive fetch, e.g., using RDMA operations, of the oplog metafile 520b is performed by the secondary node 110b from the remote node 110c. Although the I/O performance of vdisk accesses may be delayed due to redirection, the latencies impacting the performance only persists until all of the oplog metafile records are copied to the secondary node 110b. After the oplog index replica 550b of the secondary node 110b is synchronized using, e.g., the redirected oplog entries from the remote node 110c, the secondary node 110b can terminate oplog redirection and perform failover oplog operations. A fifth failover scenario is similar to the fourth scenario, but with all oplog metadata entries being entirely reconstructed with suspension of I/O accesses during recovery/reconstruction.

Alternative implementations contemplated and addressed by the technique include the use of two in-core oplog indexes on each node, where one index is configured as a point-in-time consistent image undergoing oplog index synchronization (and thus is a "frozen" copy of the oplog index unable to accept updates for new writes), and the other index is configured to accumulate the updates (i.e., the new writes). After the frozen copy of the index is synchronized, the two in-core oplog indexes are merged.

Advantageously, the technique described herein enables efficient replication of an in-core oplog index across nodes of one or more clusters to thereby substantially reduce or eliminate I/O interruption resulting from recovery (rebuilding) of metadata of the index used to improve (i.e., reduce latency of) I/O access to a vdisk in the event of a failure to a node hosting the vdisk. In other words, the technique provides a recovery optimization that allows for almost "instant" recovery and synchronization (i.e., little to no latency increase is incurred from replaying a latest episode at the secondary node during failover) of an in-core oplog index in the event of a node failure. As a result, increased-sized oplogs may be deployed to permit improved I/O servicing (e.g., greater cache hits from a larger oplog) that results in higher throughput while maintaining low latency with the additional benefit of substantially reduced recovery time.

The foregoing description has been directed to specific embodiments. It will be apparent, however, that other variations and modifications may be made to the described embodiments, with the attainment of some or all of their advantages. For instance, it is is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A non-transitory computer readable medium including program instructions for execution on a processor, the program instructions configured to:
    record, at a first node of a cluster, metadata corresponding to write accesses having data directed to a virtual disk (vdisk) of the cluster, the metadata locating the data cached in an operations log prior to persistent storage of the data at a backend of the cluster;
    update continuously, at a second node of the cluster, a copy of the metadata on the second node of the cluster using updates of the metadata from the first node by replaying records of metadata update for write accesses backwards from newer to older records to not overwrite overlapping portions of offset ranges during the update; and
    in response to a failure of the first node, fail over to the second node without interruption of servicing read accesses directed to the vdisk using the updated copy of the metadata.

2. The non-transitory computer readable medium of claim 1, wherein the program instructions for execution on the processor are further configured to:
    batch the write accesses into episode files each associated with a timestamp, wherein the updates of the metadata correspond to the episode files.

3. The non-transitory computer readable medium of claim 1, wherein the metadata is organized as a tree data structure according to offset ranges of the vdisk.

4. The non-transitory computer readable medium of claim 1, wherein the program instructions for execution on the processor are further configured to:
    coalesce random write accesses of the operations log into batches, wherein the metadata is not recorded for sequential write accesses; and
    remove the metadata corresponding to the batched write accesses that are drained to the backend of the cluster.

5. The non-transitory computer readable medium of claim 1, wherein the program instructions configured to fail over include program instructions further configured to:
    synchronize, at the second node, the updated copy of the metadata by applying only a last update from the first node.

6. The non-transitory computer readable medium of claim 1, wherein the program instructions for execution on the processor are further configured to:

store the updates of the metadata on a metadata store of the cluster, wherein the second node retrieves the updates from the metadata store.

7. The non-transitory computer readable medium of claim 6, wherein the program instructions for execution on the processor are further configured to:
update appropriate metadata in the metadata store indicating a latest update applied to the copy of the metadata at the second node.

8. The non-transitory computer readable medium of claim 1, wherein the program instructions for execution on the processor are further configured to:
send an identifier corresponding to each update of the metadata from the first node to the second node.

9. The non-transitory computer readable medium of claim 1, wherein the updates of the metadata are replicated across nodes of the cluster according to a replication factor.

10. The non-transitory computer readable medium of claim 1, wherein the program instructions configured to update continuously, at the second node of the storage cluster, the copy of the metadata include program instructions further configured to:
apply the updates of the metadata according to a timestamp included in the updates.

11. A method comprising:
recording, at a front-end of a first node of a cluster, metadata corresponding to write accesses having data directed to a virtual disk (vdisk) of the cluster, the metadata locating the data cached in an operations log prior to persistent storage of the data at a backend of the cluster;
updating continuously, at a second node of the cluster, a copy of the metadata on the second node of the cluster using updates of the metadata from the first node by replaying records of metadata update for write accesses backwards from newer to older records to not overwrite overlapping portions of offset ranges during the update; and
in response to a failure of the first node, failing over to the second node without interruption of servicing read accesses directed to the vdisk using the updated copy of the metadata.

12. The method of claim 11 further comprising:
batching the write accesses into episode files each associated with a timestamp, wherein the updates of the metadata correspond to the episode files.

13. The method of claim 11, wherein the metadata is organized as a tree data structure according to offset ranges of the vdisk.

14. The method of claim 11, further comprising:
coalescing random write accesses of the operations log into batches, wherein the metadata is not recorded for sequential write accesses; and
removing the metadata corresponding to the batched write accesses that are drained to the backend of the cluster.

15. The method of claim 11, further comprising:
synchronizing, at the second node, the updated copy of the metadata by applying only a last update from the first node.

16. The method of claim 11, further comprising:
storing the updates of the metadata on a metadata store of the cluster, wherein the second node retrieves the updates from the metadata store.

17. The method of claim 16, further comprising:
updating appropriate metadata in the metadata store indicating a latest update applied to the copy of the metadata at the second node.

18. The method of claim 11, further comprising:
sending an identifier corresponding to each update of the metadata from the first node to the second node.

19. The method of claim 11, wherein the updates of the metadata are replicated across nodes of the cluster according to a replication factor.

20. An apparatus comprising:
a cluster of nodes each having a processor and storage; and
a network interconnecting the nodes and connecting to a client, wherein the processors of the nodes are configured to:
record, at a front-end of a first node, metadata corresponding to write accesses having data from the client directed to a virtual disk (vdisk) of the cluster, the metadata locating the data cached in an operations log prior to persistent storage of the data at a backend of the cluster;
update continuously, at a second node, a copy of metadata on the second node of the cluster using updates of the metadata from the first node by replaying records of metadata update for write accesses backwards from newer to older records to not overwrite overlapping portions of offset ranges during the update; and
in response to a failure of the first node, fail over to the second node without interruption of servicing read accesses directed to the vdisk from the client using the updated copy of the metadata.

21. The apparatus of claim 20, wherein the processors are further configured to:
batch the write accesses into episode files each associated with a timestamp, wherein the updates of the metadata correspond to the episode files.

22. The apparatus of claim 20, wherein the metadata is organized as a tree data structure according to offset ranges of the vdisk.

23. The apparatus of claim 20, wherein the processors are further configured to:
coalesce random write accesses of the operations log into batches, wherein the metadata is not recorded for sequential write accesses; and
remove the metadata corresponding to the batched write accesses that are drained to the backend of the cluster.

24. The apparatus of claim 20, wherein the processors configured to fail over are further configured to:
synchronize, at the second node, the updated copy of the metadata by applying only a last update from the first node.

25. The apparatus of claim 20, wherein the processors are further configured to:
store the updates of the metadata on a metadata store of the cluster, wherein the second node retrieves the updates from the metadata store.

26. The apparatus of claim 25, wherein the processors are further configured to:
update appropriate metadata in the metadata store indicating a latest update applied to the copy of the metadata at the second node.

27. The apparatus of claim 20, wherein the processors are further configured to:
send an identifier corresponding to each update of the metadata from the first node to the second node.

28. The apparatus of claim 20, wherein the updates of the metadata are replicated across nodes of the cluster according to a replication factor.

29. The apparatus of claim 20, wherein the processors configured to update continuously, at the second node of the storage cluster, the copy of the metadata are further configured to:

apply the updates of the metadata according to a timestamp included in the updates.

\* \* \* \* \*

UNITED STATES PATENT AND TRADEMARK OFFICE
CERTIFICATE OF CORRECTION

PATENT NO.        : 11,614,879 B2
APPLICATION NO.   : 17/218465
DATED             : March 28, 2023
INVENTOR(S)       : Alok Nemchand Kataria et al.

It is certified that error appears in the above-identified patent and that said Letters Patent is hereby corrected as shown below:

In the Specification

Column 2, Line 36 reads:
"oplog is index configured to provide a state of the latest data"
Should read:
--oplog index configured to provide a state of the latest data--

Column 3, Line 10 reads:
"ery and synchronization, of the oplog index in a is batch"
Should read:
--ery and synchronization, of the oplog index in a batch--

Column 3, Line 54 reads:
"not is yet complete when the primary node fails. In-progress"
Should read:
--not yet complete when the primary node fails. In-progress--

Column 5, Line 63 reads:
"duster. That is, unlike traditional NAS/SAN solutions that"
Should read:
--cluster. That is, unlike traditional NAS/SAN solutions that--

Column 6, Line 21 reads:
"and/or HDDs) located in DSP 250 of the cluster 100."
Should read:
--and/or HDDs) located in DSF 250 of the cluster 100--

Column 7, Line 34 reads:
"bilities of DST 250. Such capabilities include migration/"

Signed and Sealed this
Twenty-fifth Day of February, 2025

Coke Morgan Stewart
*Acting Director of the United States Patent and Trademark Office*

CERTIFICATE OF CORRECTION (continued)
U.S. Pat. No. 11,614,879 B2

Should read:
--bilities of DSF 250. Such capabilities include migration/--

Column 7, Line 54 reads:
"storage, 1 MB, corresponding to a virtual address space of"
Should read:
--storage, e.g., 1 MB, corresponding to a virtual address space of--

Column 8, Lines 16-17 reads:
"in that extent group, and (3) information about the extents
such as reference counts checksums, and offset locations."
Should read:
--in that extent group, and (3) information about the extents,
such as reference counts, checksums, and offset locations.--

Column 9, Line 45 reads:
"are periodically drained to is the extent store 570, e.g., by a"
Should read:
--are periodically drained to the extent store 570, e.g., by a--

Column 19, Line 19 reads:
"oplog index is being constructed at the is secondary node."
Should read:
--oplog index is being constructed at the secondary node.--

Column 11, Line 33 reads:
"replayed to update the in-core oplog is index replica 550b"
Should read:
--replayed to update the in-core oplog index replica 550b--

Column 14, Line 8 reads:
"advantages. For instance, it is is expressly contemplated that"
Should read:
--advantages. For instance, it is expressly contemplated that--

In the Claims

Column 14, Line 34 reads:
"replaying records of metadata update for write accesses"
Should read:
--replaying records of metadata updates for write accesses--

Column 15, Line 35 reads:
"replaying records of metadata update for write accesses"
Should read:
--replaying records of metadata updates for write accesses--

CERTIFICATE OF CORRECTION (continued)
U.S. Pat. No. 11,614,879 B2

Column 16, Line 21 reads:
"metadata on the second node of the cluster using"
Should read:
--the metadata on the second node of the cluster using--

Column 16, Line 23 reads:
"replaying records of metadata update for write"
Should read:
--replaying records of metadata updates for write--